No. 878,317. PATENTED FEB. 4, 1908.
F. SEIFFERT.
EXPANSION JOINT DEVICE.
APPLICATION FILED JAN. 4, 1907.
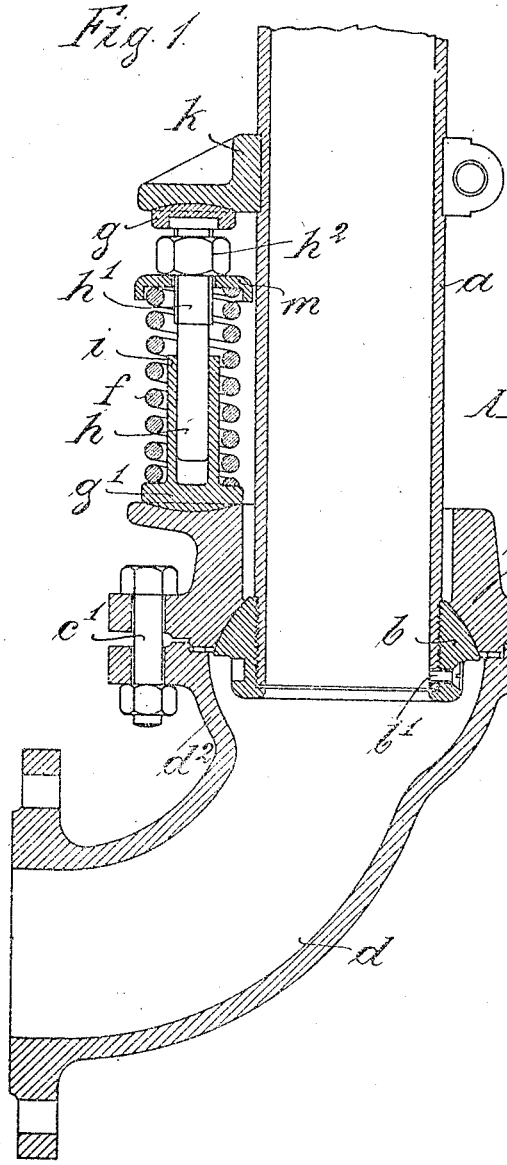
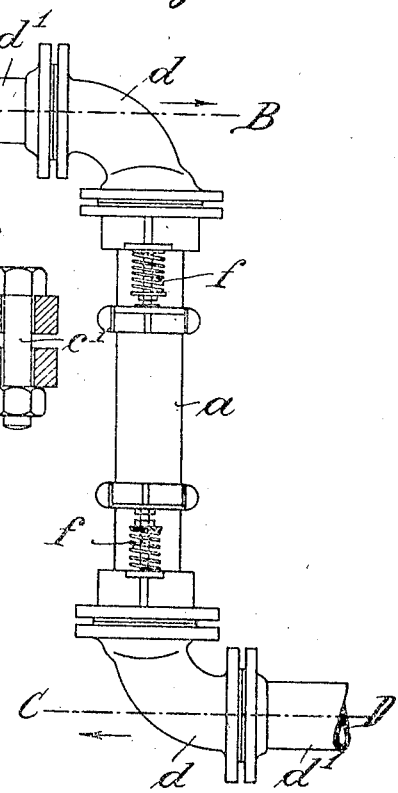
Witnesses:
Paul Wollenberg.
Emil Kayser.
Inventor
Franz Seiffert.
by Peter Ziegler
Attorney

UNITED STATES PATENT OFFICE.

FRANZ SEIFFERT, OF BERLIN, GERMANY.

EXPANSION-JOINT DEVICE.

No. 878,317.　　　　Specification of Letters Patent.　　　　Patented Feb. 4, 1908.

Application filed January 4, 1907. Serial No. 350,313.

*To all whom it may concern:*

Be it known that I, FRANZ SEIFFERT, a subject of the King of Prussia, German Emperor, and resident of 154ª Koepenickerstrasse, Berlin, Kingdom of Prussia, German Empire, manufacturer, have invented new and useful Improvements in Expansion-Joint Devices, of which the following is an exact specification.

My invention has for its object an expansion joint device for steam piping or conduits, which is applied transversely to the direction of the steam piping and permits the latter to expand in a large scale. In my new expansion joint device an expansion pipe with a ball joint at each end is employed and the ball joints have metallic contact surfaces without any stuffing box packing and tightness is insured entirely by the internal steam-pressure. This new expansion joint device is very simple and yet quite steam-tight. Furthermore provisions are made for preventing the breaking of the joint by reason of a partial vacuum if the steam is shut off. I attain this purpose by the application of springs, that tend to press the joint surfaces gently against each other. The springs abut with part spherical face-pieces, to be pressed together, so that they can easily follow any deviations of the expansion joint pipe.

In order to make my invention more clear, I refer to the accompanying drawings, in which:

Figure 1 is a fragmentary section through one end of the device, the spring-device being carried round 90 degrees from its real position in order to show it more clearly. Fig. 2 is an elevation of the complete expansion joint device in smaller scale.

$a$ is the expansion pipe and $d$ are two elbow-pieces, which are secured to the proper steam conduit $d'$ extending in the direction of the lines A—B, C—D. The pipe $a$ is arranged transversely to the direction of these lines.

$b$ is a tightening piece screwed to the one end of the expansion pipe $a$ and prevented from any accidental rotation by the bolt $b'$.

$c$ is a flange loosely arranged around the end of the expansion pipe $a$.

The tightening piece $b$ is provided with a part spherical joint face which bears against the corresponding hollow face of the flange $c$. Any stuffing box packing is dispensed with according to this arrangement.

The flange $c$ is connected by means of bolts $c'$ with the elbow-pipe $d$; of course, the usual packing is provided for obtaining a steam-tight joint between both these parts. $h$ is a bolt provided with a thread $h'$ that receives the nut $h^2$. $g$ is a head piece with a part spherical face which bears against the corresponding hollow face of the abutment $k$ fixedly secured to the expansion pipe $a$. With its lower end the bolt $h$ is located in the cylinder $i$ which is provided with a head $g'$ having a part spherical face bearing therewith against the corresponding hollow face of the flange $c$. $m$ is a cap supporting the one end of the spring $f$.

The operation of the device is as follows:— If steam is flowing through the conduit $d''$ which is expanded thereby, the ends of the conduit joined to the elbow-pieces $d$ are moved in the direction of the arrows due to the heating of the material. In consequence of this movement the expansion pipe $a$ is caused to occupy an inclined position towards the direction of the lines A—B, C—D, and due to the arrangement of the tightening pieces $b$ on the expansion pipe $a$ the latter is enabled to occupy easily such an inclined position. The steam-tight joint between both the parts $b$—$c$ is insured by the internal steam-pressure, which forces the part $b$ against the flange $c$, and for the purpose of permitting the steam to act broadly upon the part $b$ the elbow-piece $d$ is enlarged at $d^2$. Any breaking of the joint in case a partial vacuum should arise, when the steam is shut off, is prevented by the arrangement of the springs $f$ which press the joint faces of the parts $c$ and $b$ lightly against each other. Due to the arrangement of the heads $g$ $g'$ the springs $f$ are enabled to follow any deviation of the pipe $a$ from the flange $c$, and the cap $m$ can be adjusted by means of the nut $h^2$.

Having thus fully described the nature of my invention, what I desire to secure by Letters Patent of the United States is:—

1. In the herein described steam piping the combination of an expansion pipe transversely applied to the steam piping and having partly spherical faces at its ends, flanges having partly spherical faces fitting steam tight on the first mentioned faces, the faces being pressed against each other by the inner steam pressure, and springs which are supported on the one side by the said flanges and on the other side by the expansion pipe for holding the tightening surfaces in contact, when a vacuum happens in the steam piping, the spring being eccentrically arranged on the expansion pipe.

2. In the herein described steam piping the combination of an expansion pipe transversely applied to the steam piping, rings fixed to the end of the expansion pipe and having partly spherical faces, flanges, having a partly spherical face, against which the partly spherical faces of the rings are tightly pressed by the inner steam pressure, and having a bearing with a partly spherical face, abutments $k$ fixedly attached to the expansion pipe and having partly spherical faces, springs eccentrically arranged upon the expansion pipe and supporting stems consisting of two telescoped parts and having ends with partly spherical faces supporting against the partly spherical bearing of the flanges and of the abutments and means for adjusting the springs.

In witness whereof I have hereunto set my hand in the presence of two witnesses.

FRANZ SEIFFERT.

Witnesses:
WOLDEMAR HAUPT,
HENRY HASPER.